March 13, 1951 R. C. MAIN 2,545,206
TEMPERATURE CONTROL APPARATUS
Filed May 20, 1947
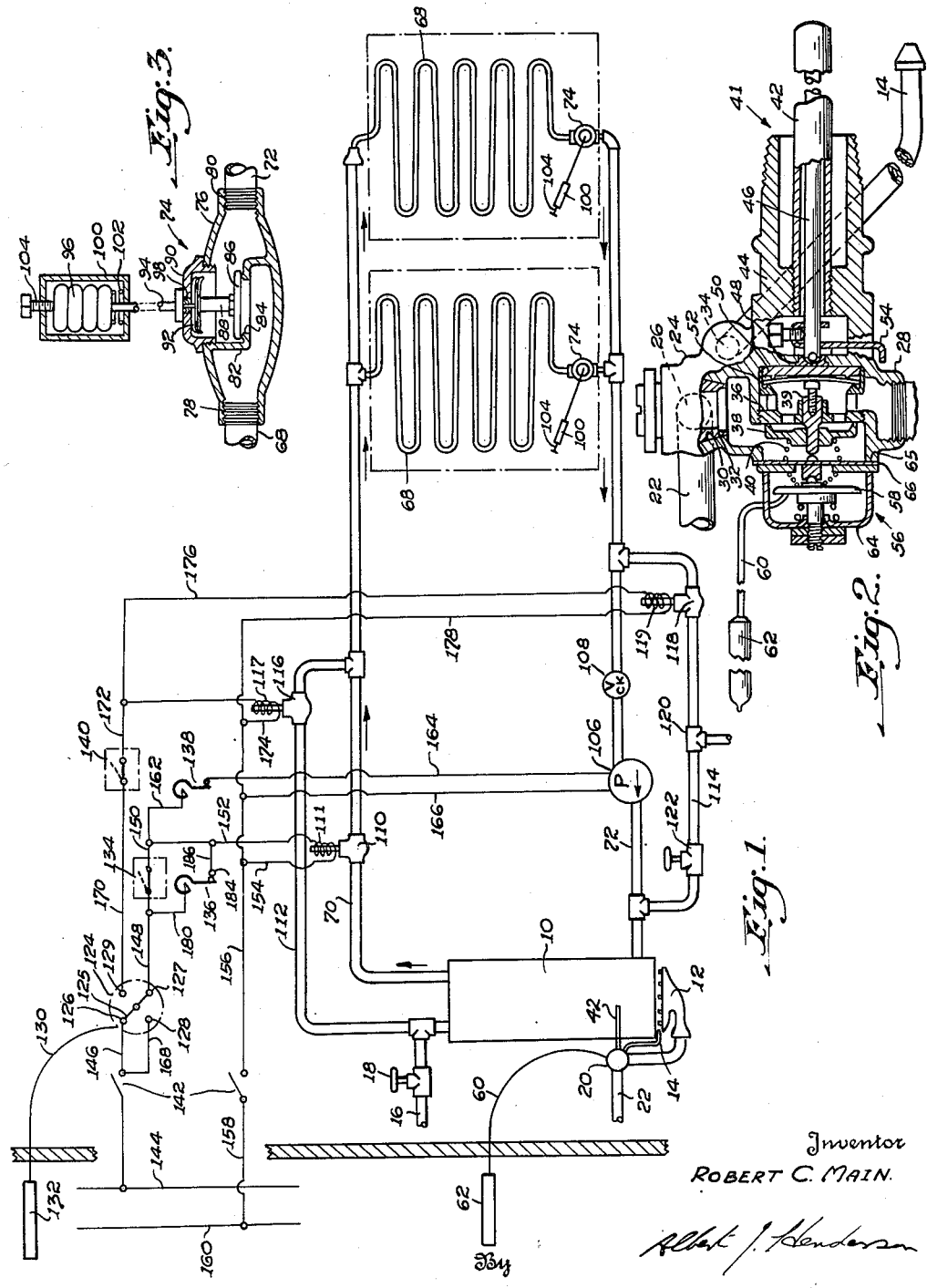
Inventor
ROBERT C. MAIN.
By Albert J. Henderson
his Attorney Patented Mar. 13, 1951

2,545,206

UNITED STATES PATENT OFFICE 2,545,206

TEMPERATURE CONTROL APPARATUS

Robert C. Main, Los Angeles, Calif., assignor to Robertshaw-Fulton Controls Company, a corporation of Delaware Application May 20, 1947, Serial No. 749,259

1 Claim. (Cl. 236—91)

This invention relates to control apparatus for air conditioning systems and, more particularly, to apparatus for controlling hot and cold water panel heating and cooling systems.

In my copending application Serial No. 749,258, filed of even date herewith, now Patent No. 2,519,266 of August 15, 1950, there is disclosed a temperature control system particularly adapted for panel heating systems utilizing heating fluid circulated from a gas-fired heater through a mixing valve subject to control by means responsive to outdoor temperatures. In this manner, the temperature of the circulating fluid is maintained proportional to the variations in outside temperature and the system serves to meet all changes in the need for heat. Additionally, provision is made to overcome the temperature lag inherent in panel heating systems and to avoid discomfort upon sudden increases in outdoor temperature, all as fully described in said copending application.

The present invention has for an object to accomplish similar automatic control of the temperature of the circulating fluid without the use of the special mixing valve disclosed in the aforesaid application.

Another object of the invention is to vary the temperature of the circulating fluid in proportion to the total heating demand as established by the outdoor temperature.

Another object of the invention is to eliminate the hunting effect due to inertia of the structure being heated.

Another object of the invention is to utilize the outdoor control apparatus for selecting the basic energy rate and not for the primary purpose of establishing an anticipating feature.

Another object of the invention is to eliminate noticeable lag in warm-up times upon a demand for heat in the space being conditioned.

Other objects and advantages will become apparent from the following description taken in connection with the accompanying drawings, wherein:

Fig. 1 is a schematic view of a panel heating system having a wiring diagram incorporated therewith;

Fig. 2 is a cross section of the temperature control device for the fuel burner shown schematically in Fig. 1; and Fig. 3 is a cross section of one of the control valves shown schematically in Fig. 1.

Referring more particularly to the drawings, Fig. 1 thereof depicts a heating means for a fluid comprising a water heater 10 equipped with main and pilot gaseous fuel burners 12 and 14 respectively. The water heater 10 is supplied with cold water under pressure from a main supply pipe 16 which is connected to a suitable source of supply such as a well, cooler or municipal water supply system. A manually operated shut-off valve 18 controls the flow of water in the main pipe 16.

The flow of fuel to the main burner 12 and, preferably, to the pilot burner 14 is controlled by a temperature control device designated generally by the reference numeral 20 and which is interposed in a main fuel supply pipe 22. As shown in detail in Fig. 2 of the drawing, the temperature control device 20 comprises a main casing 24 having an inlet opening 26 for connection to the main supply pipe 22 and an outlet opening 28 for connection to the main burner 12.

The main casing 24 adjacent the inlet opening 26 is provided with a tapered valve seat 30 for the reception of a hollow tapered shut-off cock 32 for controlling the passage of fuel from the inlet opening 26 to the interior of the main casing 24. In this embodiment the shut-off cock 32 is also provided with a passageway (not shown) for affording communication between the inlet opening 26 and an outlet opening 34 formed in the casing 24 and with which the pilot burner 14 communicates. The arrangement is such that when the cock 32 is in a pilot position, intermediate full-open and full-closed positions, then flow of fuel from the main fuel pipe 22 to the pilot burner 14 can occur without a corresponding flow of fuel through the cock 32 to the interior of the casing 24.

The interior of the casing 24 is provided with an annular valve seat member 36 against which a valve member 38 is biased by a coil spring 40 into closed position to prevent fuel flow to the outlet opening 28. The valve member 38 is provided with a valve stem 39 projecting into the valve seat member 36 and is movable toward an open position relative to the seat 36 by a first temperature responsive means 41. Thus, a tube 42 is mounted in a nipple extension 44 of the main casing 24 and a rod 46 having a lower coefficient of expansion than the tube 42 has its outer end threadedly connected to the tube 42 to complete the first temperature responsive means 41. The rod 46 is adapted upon contraction of the tube 42 to exert a thrust through a cap member 48 against a thrust member 50 both of which are positioned in the casing 24 on one side of the valve member 38. The thrust member 50 co-operates with a clicker disc 52, which engages the valve stem 39 and a portion of the valve seat 36, to force the valve member 38 toward open position against the bias of the coil spring 40. As snap-action devices of this nature are well known to the art, further description is deemed unnecessary. Temperature adjustment of the first temperature responsive means 41 may be effected through a lever 54 which is secured to the inner end of the rod 46 and is operable to rotate the rod 46 relative to the tube 42 and move it toward and away from the cap member 48.

The movement of the valve member 38 toward open position by the first temperature responsive means 41 is limited by a second temperature responsive means designated generally by the reference numeral 56 and positioned on the opposite side of the valve member 38 to the first temperature responsive means 41. The second temperature responsive means 56 comprises an actuating element 58, a capillary tube 60 and a bulb 62 which contain a thermal liquid of any suitable type for causing expansion and contraction of the actuating element 58 upon changes in temperature as sensed by the bulb 62. The actuating element 58 is supported in a cover 64 which serves as a closure for an opening 65 to the interior of the casing 24 opposite the valve seat 36. Movement of the actuating element 58 is communicated to the valve stem 39 through a diaphragm element 66 which extends between these members and is positioned by the cover 64 against the main casing 24 in sealing relation with the opening 65 therein.

The temperature control device 20 is mounted in position on the water heater 10 with the nipple extension 44 threadedly engaging the wall of the water heater 10 and the tube 42 and rod 46 of the first temperature responsive means 41 projecting into the water being heated therein. The bulb 62 of the second temperature responsive means 56 is positioned to respond to outdoor temperatures, that is, to temperatures exterior of the space being heated by the water from the water heater 10. As will be more apparent hereinafter, the amount of opening movement of the valve member 38 and thus the rate of fuel supply to the main burner 12 depend upon the outside temperature as sensed by the bulb 62, it being apparent that the valve member 38 cannot be moved away from the seat 36 any greater distance than is permitted by the diaphragm element 66.

Referring now further to Fig. 1 of the drawings, means are provided for circulating fluid in heat exchange relation with the water heater 10 and a space to be heated. This circulating means includes a plurality, in this instance two, of panel heating coils 68 located in different spaces to be heated and which coils are customarily imbedded in the ceilings, walls or floors of different rooms. A supply pipe 70 and a return pipe 72 are each connected at one end thereof to opposite ends of the coils 68 and the opposite ends of the pipes 70, 72 are both connected to the water heater 10.

Means responsive to temperature changes within the spaces being conditioned by the coils 68 is provided and is effective for controlling the temperature of the spaces by controlling the flow of heated fluid to the coils 68. This means comprises a combined throttling valve and temperature sensitive element designated generally as a thermostatic valve 74 and shown in detail in Fig. 3 of the drawings. The thermostatic valve 74 comprises a valve body 76 having an inlet 78 and outlet 80 separated by a partition 82. The partition 82 is suitably apertured to provide a passage 84 controlled by a valve member 86 having a stem 88 projecting at one end into a bonnet member 90.

An expansible actuating member 92 is secured to the projecting end of the valve stem 88 and is subject to the pressure of a thermal liquid contained within the actuating member 92 and within a capillary tube 94 and bellows element 96 connected thereto in a closed system. The end of the capillary tube 94 adjacent the actuating element 92 communicates with a hollow bushing 98 carried by the actuating member 92 and secured to the bonnet 90. The opposite end of the capillary tube 94 communicates with the bellows 96 which may be positioned at any desired distance from the actuating member 92. The bellows element 96 is housed within a casing 100 and is engaged at one end by an override spring 102 supported in the casing 100 and at the other end by an adjusting screw 104 which projects exteriorly of the casing 100.

One of the thermostatic valves 74, as indicated in Fig. 1 of the drawings, is provided for each coil 68 and is positioned with the valve body 76 connected between the related panel coils 68 and the return pipe 72 to control the flow of fluid therein. Thus, the inlet 78 of each valve 74 is connected to the coil 68 and the outlet 80 is connected to the return pipe 72. The casing 100 containing the bellows element 96 is secured in some convenient location within the space responsive to condition of the related coils 68. The position of each valve member 86 relative to the passage 84 will be controlled by the position of the actuating member 92 responsive to the thermal condition of the bellows 96. It should be noted that a throttling or modulating type of control is provided as will hereinafter be apparent. Upon a sufficient increase in the temperature to which the bellows 96 responds, as regulated by the adjusting screw 104, then the valve member 86 will be moved to closed position relative to the passage 84 to shut off the flow of fluid from the inlet opening 78 to the outlet opening 80.

Circulation of the fluid from the water heater 10 through the flow and return pipes 70, 72 respectively is effected by the provision of a pump 106 which is connected in the return pipe 72 between the coils 68 and the water heater 10. A check valve 108 is provided in the return pipe 72 between the pump 106 and the coils 68 to insure the desired direction of flow. The flow of fluid between the water heater 10 and the coils 68 is under control of flow controlling means comprising a first solenoid valve 110 which is interposed at a convenient location between these elements and is electrically operated upon energization of its coil 111 by means to be described hereinafter.

Provision is made for flushing the coils 68 with relatively cold water for limited periods when the outside temperature exceeds a certain predetermined value. Thus, an upper by-pass pipe 112 is connected at one end to the main inlet pipe 16 ahead of the water heater 10 and to the supply pipe 70 at the opposite end, the latter connection being intermediate the solenoid valve 110 and the coil 68. A lower by-pass pipe 114 has one end connected to the return pipe 72 between the check valve 108 and the thermostatic valve 74 and has its opposite end connected to the return pipe 72 intermediate the pump 106 and the water heater 10.

The flow of fluid in the upper and lower by-pass pipes 112 and 114 is under control of flow controlling means comprising second and third solenoid valves 116 and 118 respectively, which are electrically operated upon energization of coils 117 and 119 respectively by means to be described hereinafter. A drain connection 120 and a manually operated shut-off valve 122 are provided in the lower by-pass pipe 114 between the third solenoid valve 118 and the connection of the by-pass pipe 114 to the return pipe 72 adjacent the water heater 10.

Thermostatic switch means 124 are provided for controlling the operation of the flow controlling means comprising the solenoid valves 110, 116 and 118. The thermostatic switch means 124 includes a rotatable switch arm 125 adapted to connect a pair of diametrically opposite contact means 126, 127 or, alternatively, another pair of diametrically opposite contact means 128 and 129. Movement of the switch arm 125 into one or the other of said cooperative positions is caused by response of the thermostatic switch means 124 to changes in temperature exterior of the spaces conditioned by the coils 68. In this instance, a thermal actuating element (not shown) for the switch arm 125 is connected by a capillary tube 130 to a bulb element 132 which is located outdoors to respond to the temperature at that location.

The system includes means to turn the circulating pump 106 off during the night hours and such means is shown as comprising a switch 134. It will be understood that a clock control (not shown) is included for operating the switch 134 at preset times but as such devices are well known further description is deemed unnecessary. The switch 134 is arranged to control the pump 106 only as permitted by a low temperature cut-off thermostat 136 which, as will be hereinafter apparent, reestablishes the operation of the pump 106 if the temperature in the spaces being heated by coils 68 falls below a certain predetermined temperature for which the thermostat 136 is set. A thermostatic cut-out 138 is located at the motor of the pump 106 to respond to excess temperatures at that point.

The flow of cooling fluid in the upper and lower by-pass pipes 112 and 114 is controlled by operation of a timing device which is shown here merely as a switch 140. Such timing devices employ a low speed electric drive from a synchronous clock motor (not shown) and normally maintain a closed circuit position when deenergized. In this instance, the timing device including switch 140 is of the type which can be set to remain closed for approximately five minutes upon energization, will open and remain open for approximately twenty-five minutes when energized and then will automatically recycle. It will be apparent hereinafter that immediately upon closing of the circuit wherein it is connected, the switch 140 will introduce a five-minute period during which cold water flushing for the coils 68 can be conducted. Further operation of the switch 140, together with that of the remaining components of the system, will be apparent from the description of the operation of the temperature control system, which now proceeds, it being noted that a description of the wiring diagram is now included.

In the operation of the system, it can be assumed that the thermostatic switching device 124 is in the position shown in Fig. 1 of the drawings and that the outside temperature to which the bulb 132 is responsive is such as to cause the switch arm 125 to remain in the position shown for closing the contacts 126, 127 and establishing a heating circuit. It is further assumed that the clock-operated switch 134 is also in the closed position shown in full lines in the drawing. The thermostatic cut-out 138 is assumed to be responding to a temperature condition lower than that for which it is set to open and is therefore in the closed position shown in the drawings. Thus, upon closing of a double-pole main switch 142, a circuit is established as follows: line wire 144, upper pole of main switch 142, wire 146, contact 126, switch arm 125, contact 127, wire 148, switch 134, wire 150, wire 152, coil 111, wire 154, wire 156, lower pole of main switch 142 and wire 158 to line wire 160. Such circuit will serve to energize the coil 111 and the solenoid valve 110 will therefore open.

Simultaneously, a parallel circuit is established as follows: line wire 144, upper pole of main switch 142, wire 146, contact 126, switch arm 125, contact 127, wire 148, switch 134, wire 150, wire 162, thermostatic cut-out 138, wire 164, pump 106, wire 166, wire 156, lower pole of main switch 142 and wire 158 to line wire 160. This circuit will serve to energize the pump 106 for circulation of fluid through the coils 68.

The temperature setting of the first temperature responsive means 41 comprising tube 42 and rod 46 is adjusted by operation of the lever 54 to a predetermined setting. Assuming that there is a demand for heat in the fluid to be circulated by reason of the temperature thereof being lower than the setting of the lever 54, then the first temperature responsive means 41 operates through the snap-action device 48, 50, 52 to open the valve member 38. The amount of opening movement of the valve member 38, however, depends upon the position of the diaphragm 66 which is positioned relative to the valve stem 39 by cooperation of the actuating element 58.

When the outside temperature to which the bulb 62 responds is above a predetermined minimum temperature, then the actuating element 58 will correspondingly limit the amount of opening movement available to the valve member 38. With this reduced rate of fuel supply to the main burner 12, the recovery time of the water heater 10 is increased. Since continuous circulation is employed in the system, the average water temperature will tend to remain below the setting of the lever 54 until the heat demand is satisfied and the pump 106 deenergized by operation of the thermostatic switching device 124 responding to the outdoor temperature sensed by the bulb 132. Thereafter, the water in the water heater 10 will continue to be heated until the temperature setting of the lever 54 is reached, whereupon operation of the first temperature responsive means 41 causes closure of the valve member 38 under bias of the spring 40.

It will be apparent that the net result of the foregoing action is that the rate of fuel supply to the main burner 12 and the temperature of the water circulated to the coils 68 are varied in proportion to the total heating demand of the space being heated by the coils 68 as established by the outdoor temperature sensed by the bulbs 62 and 132. This action is desirable as tending to prevent "hunting" or slow oscillations that can occur due to the inertia of the structure being heated. The control modulates the supply of energy to the coils 68 and restricts the amount of energy which is available to a small range on either side of the normal quantity corresponding to a given load. It will further be apparent that the control apparatus responsive to outdoor temperatures is used as a means of selecting the basic energy rates and is not for the primary purpose of establishing an anticipating feature.

The thermostatic valves 74 provide a throttling type of control to automatically compensate for changes in the individual zone temperature conditions. The devices are thus distinguished from the usual manually set and relatively inaccessible valves which require careful and tedious adjustment to obtain the desired heat balance conditions. Full use is made in this invention of the modulating or throttling action of the valves 74 in the intermediate positions of the valve members 86 and the result is an improvement over the on-off type of operation customarily obtained. In addition, these valves 74 automatically compensate for changes in the heat input requirements caused by variable factors such as solar radiation, shifting winds, open windows, supplemental heat sources such as fireplaces and any other factors which might affect the heating requirements of the zone. It is apparent that the automatic adjustment of the valves 74 between open and closed positions for either complete shut-off, throttling action or full-open flow eliminates the expense involved in balancing or adjusting each individual zone manually.

The described deenergization of the pump 106 by operation of the thermostatic switch means 124 will occur when the outside temperature to which the bulb 132 responds exceeds a certain predetermined value for which the switch means 124 has been set. Consequently, the switch arm 125 is operated to open the contacts 126, 127 and close the contacts 128, 129. Such operation will serve to open the circuit of the coil 111 of the solenoid valve 110 and also the circuit of the pump 106 as previously traced. The pump 106 thereupon ceases to circulate fluid to the coils 68 and the flow of heated fluid from the water heater 10 to the supply pipe 70 is cut off by closing of the solenoid valve 110.

In the new position of the switch arm 125 the following circuits are established: line wire 144, upper pole of main switch 142, wire 163, contact 128, switch arm 125, contact 129, wire 170, switch means 140, wire 172, coil 117, wire 174, wire 156, lower pole of main switch 142 and wire 158 to line wire 160. This circuit will serve to energize the coil 117 and the solenoid valve 116 thereupon opens.

The other circuit established in the new position of the thermostatic switch means 124 is as follows: line wire 144, upper pole of main switch 142, wire 168, contact 128, switch arm 125, contact 129, wire 170, switch means 140, wire 176, coil 119, wire 178, wire 156, lower pole of main switch 142 and wire 158 to line wire 160. This circuit serves to energize the coil 119 and the solenoid valve 118 thereupon moves to open position.

As previously stated, the timing device 140 is in closed position when deenergized and will remain in closed position for a limited period, such as five minutes, upon energization of the circuit to which it is connected. Thus, for this limited period unheated fluid under pressure from the source of supply will be delivered to the coils 68 through the upper by-pass pipe 112, supply pipe 70 and coils 68 for flushing purposes. The pressure of the fluid so delivered is sufficient to force the valve members 86 of the thermostatic valves 74 to their maximum open position regardless of the expanded position of the bellows 96 and the actuating members 92. Such operation will not damage the mechanism inasmuch as the override spring 102 serves to accommodate the added expansion of the bellows 96. After passing through the thermostatic valves 74 the cooling fluid travels through the return pipe 72 to the lower by-pass pipe 114 and is discharged through the drain connection 120.

The timing device 140 provides the described cycling action for the cooling operation by opening the circuit of the coils 117, 119 of the solenoid valves 116, 118 after the five-minute period has elapsed and maintaining these valves closed for the next twenty-five minutes. In the event that the switch arm 125 remains in the new position for closing the contacts 128 and 129, then a continued cycle of intermittent cold water flushing for five-minute periods ensues. Upon return of the switch arm 125 to its original position for closing the contacts 126, 127, then the heating circuit will again be closed as previously described.

During the night-time the night clock switch 134 can be adjusted to open the heating circuit previously traced and deenergize the pump 106 as desired. During this period should the temperature in the space in which the thermostat 136 is located fall below that for which this thermostat has been set, then a shunt circuit is established around the night clock switch 134 by wire 180 connected at one end to wire 148 and at the opposite end to the movable arm of the thermostat 136, and by wire 186 connected at one end to contact 184 of the thermostat 136 and at the opposite end to wire 152. Such shunt circuit will, of course, serve to cause energization of pump 106 despite the open position of the switch 134.

It should be observed that the initial energization of the pump 106 to circulate heated fluid to the coils 68 will result in circulation of fluid which is hotter than that which is normally required to satisfy outside temperature conditions. This quick-heat feature tends to eliminate the lag in warm-up times so noticeable with other types of control and is due to the valve member 38 of the temperature control device 20 remaining open for a limited period after the pump 106 is shut down. As previously described, the valve member 38 is not permitted to close under bias of the spring 40 until the first thermostatic means 41 comprising tube 42 and rod 46 responds to the temperature for which the lever 54 has been set.

In general, the system controls the temperature of the circulating water in accordance with variations in the outdoor temperature. The temperature of the individual rooms or zones being heated by the coils 68 is controlled by varying the flow rate of the coils 68 in proportion to the actual room temperature as will be apparent. It will be understood that many changes may be made in the details of construction and arrangement of parts without departing from the scope of the invention so that this description and accompanying drawings are intended by way of illustration only and are not to be construed in a limiting sense.

I claim:

A temperature control device comprising a casing having a passageway for fluid and a valve seat positioned in said passageway, a valve member reciprocable between fully open and fully closed positions relative to said seat for controlling the flow of fluid through said passageway, means operable on said valve member for biasing the same to said closed position and preventing said fluid flow, snap-action means positioned on one side of said valve member, temperature responsive means operably associated with said snap-action means for operating the same in response to variations from a predetermined desired temperature condition to overcome said bias and move said valve member to said open position and permitting said fluid flow, second temperature responsive means including an expansible diaphragm element positioned on the opposite side of said seat and having gradual movement relative to said valve seat, and means movable by said diaphragm to a plurality of different positions in the path of said valve member under varying temperature conditions affecting said second temperature responsive means for limiting the movement of said valve member to positions intermediate said fully open and fully closed and throttling said fluid flow.

ROBERT C. MAIN.

REFERENCES CITED

The following references are of record in the file of this patent:

UNITED STATES PATENTS

| Number | Name | Date |
| --- | --- | --- |
| 1,980,789 | Dillman | Nov. 13, 1934 |
| 2,262,194 | Newton | Nov. 11, 1941 |
| 2,358,637 | Hawk et al. | Sept. 19, 1944 |
| 2,361,945 | Jackson | Nov. 7, 1944 |
| 2,383,401 | Mantz | Aug. 21, 1945 |